(12) United States Patent
Koenig

(10) Patent No.: US 6,393,699 B1
(45) Date of Patent: May 28, 2002

(54) METHOD FOR FORMING A BEARING

(76) Inventor: Larry E. Koenig, c/o Komar Industries, Inc., 4425 Marketing Pl., Groveport, OH (US) 43125

( * ) Notice: Subject to any disclaimer, the term of this patent is extended or adjusted under 35 U.S.C. 154(b) by 0 days.

(21) Appl. No.: 09/317,063

(22) Filed: May 10, 1999

Related U.S. Application Data

(62) Division of application No. 09/032,936, filed on Mar. 2, 1998, now Pat. No. 6,000,852.

(51) Int. Cl.[7] .......................... B23P 17/00; F16C 33/02
(52) U.S. Cl. .................................... 29/898.06; 384/282
(58) Field of Search ............................... 384/282, 283, 384/284, 285, 286, 322, 397; 29/898.06, 898.067, 464, 428, 525.01, 898.064; 82/1.11, 46, 47

(56) References Cited

U.S. PATENT DOCUMENTS

| | | | |
|---|---|---|---|
| 199,121 A | 1/1878 | Sweeney | |
| 707,176 A | 8/1902 | Steiner | |
| 1,113,754 A | * 10/1914 | Clemens | 384/283 |
| 1,398,219 A | * 11/1921 | Acheson, Jr. | 384/283 |
| 1,936,894 A | 11/1933 | Whiteley | |
| 3,235,316 A | 2/1966 | Whanger | |
| 3,436,129 A | * 4/1969 | James | 384/282 |
| 3,866,987 A | 2/1975 | Garner | |
| 4,486,104 A | 12/1984 | Vezirian et al. | |
| 4,499,642 A | 2/1985 | Vezirian et al. | |
| 4,685,172 A | * 8/1987 | O'Connor | 16/2 |
| 4,756,631 A | * 7/1988 | Jones | 384/95 |
| 5,322,372 A | 6/1994 | You et al. | |
| 5,549,394 A | * 8/1996 | Nowak et al. | 384/282 |
| 5,716,143 A | * 2/1998 | Browne et al. | 384/192 |

* cited by examiner

*Primary Examiner*—David P. Bryant
(74) *Attorney, Agent, or Firm*—Stanley & Gilcrest LLP

(57) ABSTRACT

A bearing assembly comprises a pair of relatively rotatable bearing components, where at least a portion of one of the bearing components is journalled to at least a portion of the other one of the bearing components. One of the first bearing component includes an outer, annular journalled surface and the second bearing component includes an inner, annular journalled surface, and one of the outer or inner and inner journalled surfaces include a plurality of recesses disposed there about. Each of the plurality of recesses are filled with an insert formed from a solid, abrasion resistant, self lubricating material; and the insert protrudes outwardly from the recesses, thereby providing a bearing surface for wearing against the other one of the annular journalled surfaces. Preferably, the solid, abrasion resistant, self-lubricating material is a polyamide resin material.

12 Claims, 6 Drawing Sheets

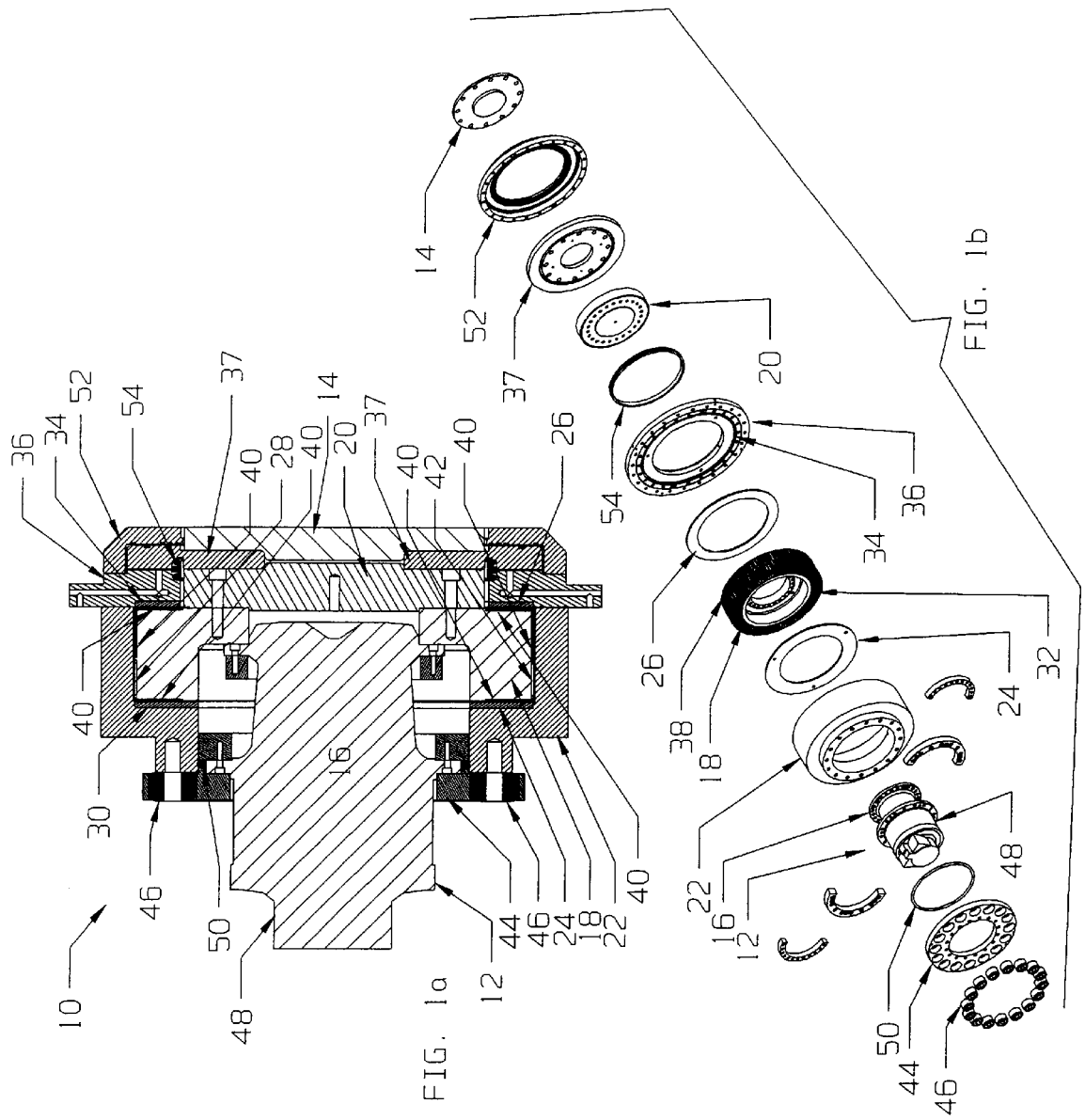

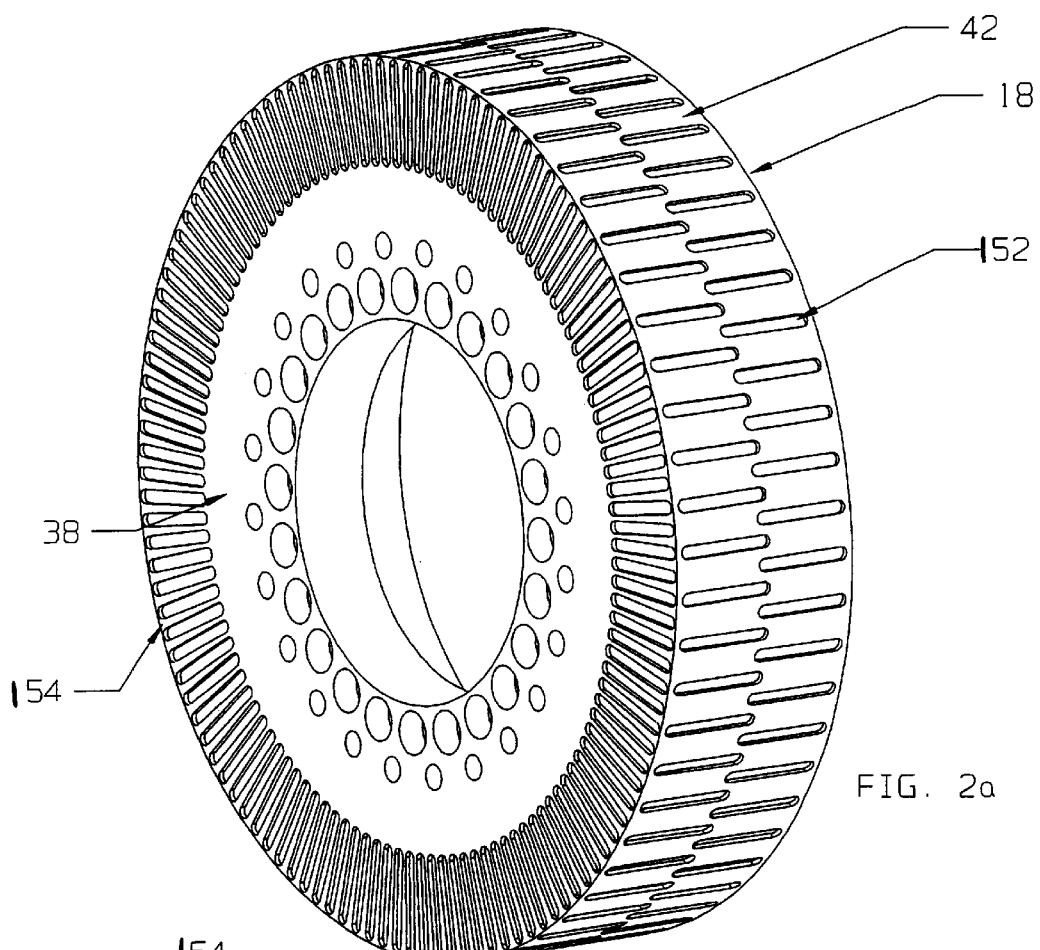
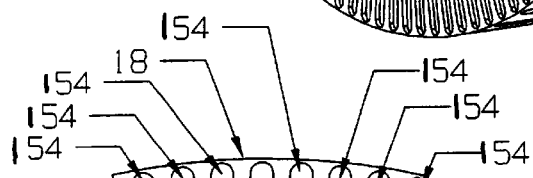
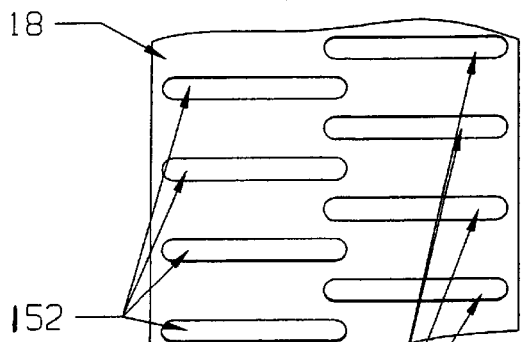
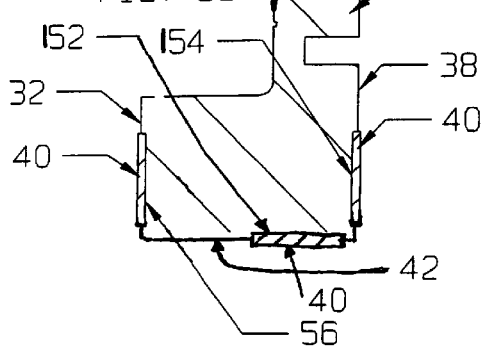

METHOD FOR FORMING A BEARING

CROSS-REFERENCE TO RELATED APPLICATIONS

The present application is a divisional application from U.S. application Ser. No. 09/032,936, filed Mar. 2, 1998, now U.S. Pat. No. 6,000,852.

BACKGROUND

The present invention relates to a journal bearing assembly and to a method for fabricating the journal bearing assembly.

Shear shredder machines, briquetting machines, grinding machines, and other types of material processing machines typically use a pair of co-acting, substantially parallel, counter-rotating roller assemblies. For example, U.S. Pat. No. 5,484,112 and U.S. Pat. No. 6,092,753 disclose a modular material processing apparatus that includes a pair of co-acting, substantially parallel, counter-rotating roller assemblies, where each of the roller assemblies includes a substantially cylindrical, material processing roller member mounted to a rotating shaft which extends substantially parallel with the longitudinal sides of the frame of the apparatus. Each of the roller assemblies are supported onto the frame by a pair of supports, a first support mounted to one lateral end of the frame and a second support is mounted to the opposite lateral end of the frame. Each of the supports include a bearing housing journalling a cylindrical bearing member mounted or keyed to the shaft of the associated roller assembly.

Conventional bearing assemblies for use with such material processing apparatuses commonly utilize roller-bearing components, such as tapered roller bearings. A disadvantage with such roller-bearing components is their expense and relatively short life span. Another disadvantage of such roller-bearing components is that they provide a limited surface area for bearing the load of the rotational member. Accordingly, it is desirable to provide a bearing assembly which has a greater life span than the comparably size roller-bearing assemblies, that is less expensive than conventional roller-bearing assemblies, and which provides a greater surface area to bear the load of the rotating members.

SUMMARY

The present invention provides a bearing assembly comprising a pair of relatively rotatable bearing components, where at least a portion of one of the bearing components is journalled to at least a portion of the other one of the bearing components. One of the first bearing component includes an outer, annular journalled surface and the second bearing component includes an inner, annular journalled surface, and one of the outer or inner and inner journalled surfaces include a plurality of recesses disposed there about. Each of the plurality of recesses are filled with an insert formed from a solid, abrasion resistant, self lubricating material; and the insert protrudes outwardly from the recesses, thereby providing a bearing surface for wearing against the other one of the annular journalled surfaces. Preferably, the solid, abrasion resistant, self-lubricating material is a polyamide resin material such as Vespal, commercially available from DuPont Corporation. Alternatively, the material may be a high load, high heat, low expansion ceramic composite material.

Preferably, the recesses and associated inserts are provided both on an annular circumferential surface and a radial side surface. Accordingly, the inserts are adapted to withstand both the perpendicular moment loads and the thrust loads of the bearing assembly.

The recesses and associated inserts on the annual circumferential surface preferably extend in an axial direction and are preferably substantially evenly distributed thereabout. The recesses and associated inserts on the side surfaces preferably extend substantially radially, and in one embodiment, may be angled with respect to the radius of the side surfaces.

In a preferred embodiment, the present invention includes a cylindrical bearing member mounted to or keyed to the roller member shaft of the material processing assembly, and further includes a bearing housing fixedly attached to the frame of the material processing apparatus, where the bearing housing includes a cylindrical cavity for receiving the cylindrical bearing member therein. The cylindrical bearing member preferably includes a plurality of axially extending, oblong inserts mounted on the outer circumferential surface thereof, and also preferably includes a plurality of substantially radially extending, oblong inserts mounted to both radial side surfaces. The inserts are preferably formed from a solid, abrasion resistant, self-lubricating polyamide material, and the inserts protrude above their respective surfaces to a certain extent. Accordingly, when the cylindrical bearing member is journalled within the cylindrical cavity of the bearing housing, only the inserts contact the inner surfaces of the bearing housing. Additionally, in the preferred embodiment, the bearing housing includes a lubricant channel in fluid communication with the inner interior surfaces of the bearing housing which allows for the injection of lubricating fluids, such as grease or oil, between the journalled bearing member and bearing housing.

The present invention also provides a method of forming a bearing comprising the steps of: (a) forming an outer member having a radially inwardly facing bearing surface, (b) forming an inner member having a radially outwardly facing bearing surface, (c) forming a plurality of recesses in the radially outwardly facing bearing surface of the inner member, (d) attaching a plurality of solid, abrasion resistant, friction members to the radially outwardly facing bearing surface by inserting the friction members into the recesses such that a portion of the friction members protrudes outwardly therefrom, (e) turning the inner member to remove material from the protruding portion of the friction members such that a selected overall dimensional tolerance of the inner member is achieved, and (f) assembling the bearing by inserting the inner member into the outer member.

Accordingly, it is an object of the present invention to provide a journal bearing that provides a greater life span than comparably sized roller bearings, that is less expensive than comparably sized roller bearing assemblies, and that provides greater bearing surfaces than comparably sized roller bearing assemblies. These and other objects and advantages of the present invention will be apparent from the following description, the accompanying drawings and the appended claims.

BRIEF DESCRIPTION OF THE DRAWINGS

FIG. 1a is a elevational, cross sectional view of a drive assembly for use with a material processing apparatus, incorporating the bearing assembly of the present invention;

FIG. 1b is a perspective, exploded view of the drive assembly of FIG. 1a;

FIG. 2a is a perspective view of a first embodiment of a bearing member of the present invention;

FIG. 2b is a magnified, broken away view of a side surface of the bearing member of FIG. 2a illustrating the substantially radially extending recesses;

FIG. 2c is a magnified, broken away view of a circumferential surface of the bearing member of FIG. 2a illustrating the axially extending recesses;

FIG. 2d is an elevational, cross sectional side view of the bearing member of FIG. 2a including the inserts mounted within the recesses;

FIG. 4a is a perspective view of a second embodiment of a bearing member for use with the present invention;

FIG. 4b is an elevational, cross sectional side view of the bearing member of FIG. 4a;

DETAILED DESCRIPTION

Figure 3A:
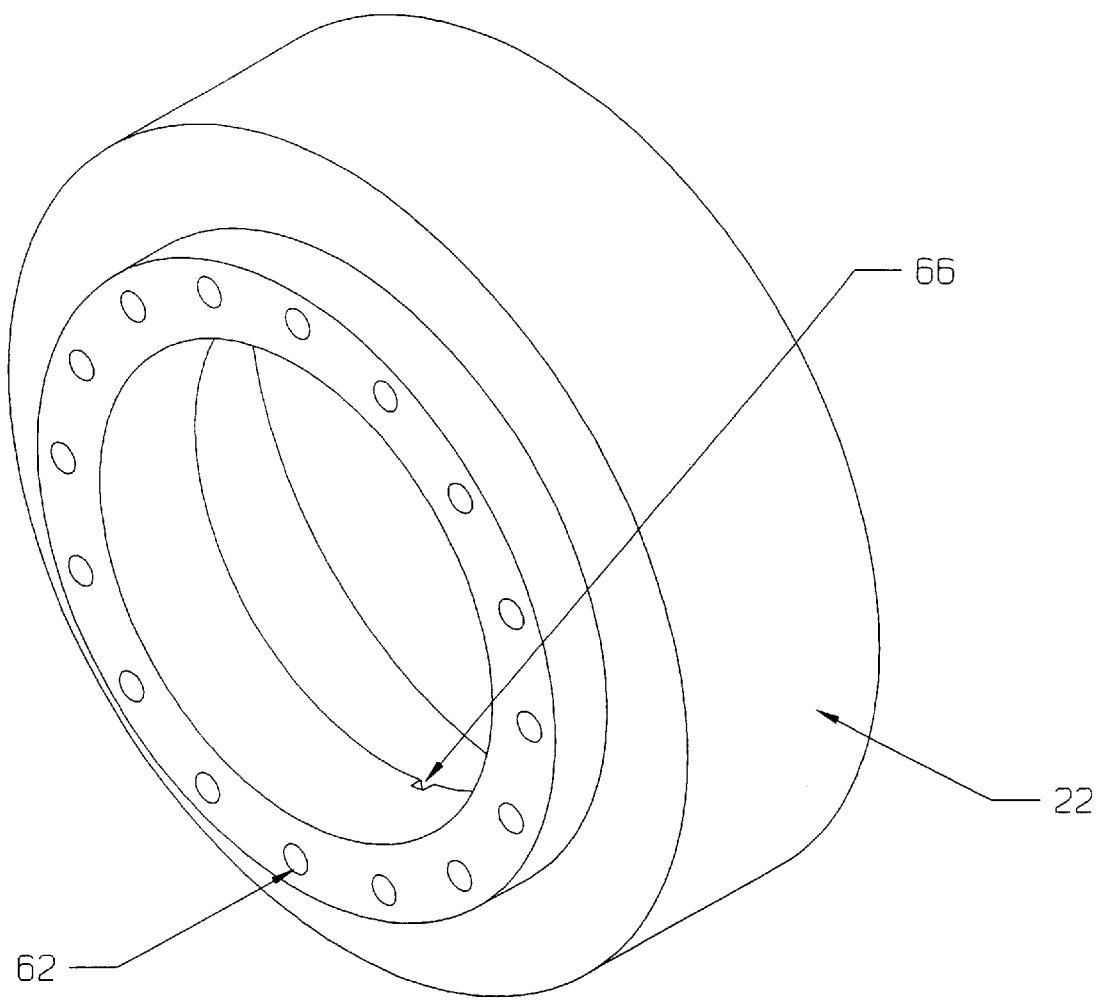
FIG. 3a is a perspective view of a bearing housing member for use with the present invention.

As shown in FIGS. 1a and 1b, the drive assembly, generally designated as 10, for rotatably driving one of the counter-rotating material processing roller members (not shown) of a material processing device, includes a hydraulic motor 12 coupled to, and rotatably driving an attachment plate 14. The attachment plate 14 is bolted to one of the counter-rotating roller members of the material processing assembly, as disclosed in U.S. Pat. No. 5,484,112, the disclosure which is incorporated herein by reference. The hydraulic motor 12 includes a drive shaft 16 which is bolted within the hub of a toroidal bearing member 18. The bearing member 18 is coupled to a bearing disc 20, coupled to disc 37, which is in turn coupled to attachment plate 14.

The bearing member 18 is journalled within a bearing housing 22 and a pair of wear rings 24,26. The bearing housing 22 includes a substantially cylindrical cavity 28 for receiving the bearing member 18 rotatably therewithin. The bearing member 18, the bearing housing 22, and the wear rings 24, 26 are all preferably formed or cast from a hardened metallic material such as 4140 steel. The wear ring 24 is seated within a correspondingly shaped, annular recess 30 milled into the proximal inner surface of the cavity 28. The wear ring 24 is therefore positioned to abut the proximal, radial side bearing surface 32 of the bearing member 18. The other wear ring 26 is seated within a correspondingly shaped cylindrical recess 34 milled into a proximal side surface of a bearing guide plate 36, which is bolted to the distal end of the bearing housing 22. The wear ring 26 is therefore adapted to abut the distal, radial side surface 38 of the bearing member 18. As will be discussed in detail below, the bearing member 18 includes a plurality of solid, abrasion resistant, self-lubricating friction members or inserts 40 attached to the radial side surfaces 32, 38 and to the circumferential surface 42 of the bearing member 18. The inserts 40 carried on the side surfaces 32, 38 are provided to wear against the respective wear rings 24, 26; and the inserts carried on the circumferential surface 42 of the bearing member are provided to wear against the inner circumferential surface of the cavity 28 in the bearing housing 22. Accordingly, the inserts 40 carried on the side surfaces 32, 38 are provided to bear the thrust loads of the rotating roller member; and the inserts 40 carried on the circumferential surface 42 are provided to bear the perpendicular moment loads of the rotating roller member.

The drive assembly further includes a torque disc 44 and a sleeve assembly 46 for mounting the motor housing 48 of the motor 12 to the proximal end of the bearing housing 22. An O-ring member 50 is provided as a seal between the torque disc 44 and the motor housing 48. The drive assembly further includes a deflector ring 52 mounted to the distal end of the bearing guide plate 36 and further includes a O-ring member 54 providing a seal between the bearing guide plate 36 and the disc 37.

Although the bearing assemblies described herein are described as a component of a material processing apparatus, the discussion of the material processing apparatus merely provides an example application for utilizing the bearing assemblies, and it is to be understood that the bearing assemblies of the present invention are not to be limited for use with any particular application.

As shown in FIGS. 2a–2d, a first embodiment of the bearing member 18 includes a plurality of axially extending oblong, recesses or notches 152 milled into the outer circumferential surface 42 of the bearing member 18. As shown in FIG. 2c, the notches 52 extend substantially half the width of the circumferential surface 42, where half of the notches extend from the distal end towards the axial center while the other half of the notches extend from the proximal end toward the axial center, and where the two sets of notches are intermeshed with each other so that they are staggered in a step-like fashion. As shown in FIG. 2d, each of the notches 152 include a solid, abrasion resistant, self lubricating insert 40 seated therein, and protruding radially therefrom to a certain extent. The insert 40, is preferably formed from a solid, abrasion resistant, self-lubricating, polyamide material such as Vespal, commercially available from DuPont Corporation. Other suitable materials for use in the fabrication of the staves 40 include solid, abrasion resistant, self-lubricating composite ceramic materials as are known to those of ordinary skill in the art.

As shown in FIGS. 2a and 2b, the proximal side surface 38 of the bearing member 18 includes a plurality of radially extending, oblong, recesses or notches 154 milled therein. The notches 154 preferably extend from the outer circumference of the side surface 38 inwardly to a point distal from the outer circumference. Referring back to FIG. 1a, the length of the notches 154 preferably match the radial width of the wear ring 26.

As shown in FIG. 2d, a plurality of correspondingly shaped, abrasion resistant inserts 40 are seated within the notches 154 and extend and protrude axially therefrom so as to provide a bearing surface against the wear ring 26. A plurality of notches 56 is also formed or milled into the proximal side surface 32 of the bearing member 18 in a fashion substantially identical to the notches 154 milled into the distal side surface 38. Likewise, a plurality of abrasion resistant inserts 40 are seated within, and protrude axially outwardly from the notches 56 to provide a bearing surface against the wear ring 24.

Preferably the inserts 40 on the circumferential surface and the radial side surfaces are placed in close proximity to one another so as to maximize the total bearing surfaces for the bearing member. Furthermore, while disclosed as being seated within notches milled into the circumferential and radial side surfaces, it is also within the scope of the invention to attach the inserts to such surfaces using bolts, screws, epoxy, or any other fastening means as known to those of ordinary skill in the art.

Figure 3B:
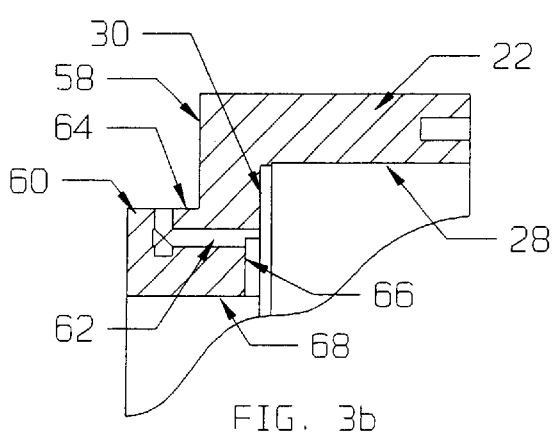
FIG. 3b is a broken away, cross sectional view of the bearing housing member of FIG. 3b.

As shown in FIGS. 3a and 3b, the bearing housing 22, as discussed above, is substantially cylindrical and includes a substantially cylindrical cavity 28 extending into its distal end for receiving the bearing member 18. Also, milled into the proximal side surface of the cavity 28 is a substantially annular recess 30 for receiving the wear ring 24 therewithin. Extending from the distal surface 58 of the housing 22 is a substantially annular ring 60 which includes a plurality of bores 62 extending axially therein for bolting the motor housing 48 thereto. The bearing housing 22 also includes an L-shaped channel 62 providing fluid communication between the outer circumferential surface 64 of the ring 60 and the cylindrical cavity 28. A radial notch 66 provides fluid communication between the L-shaped channel 62 and the hub 68 of the housing 22. Accordingly, in operation, the L-shaped channel 62 provides a means to inject oil, grease or other lubricating liquids between the wear ring 24 and the proximal side surface 32 of the bearing member 18.

Figures 4A, 4B:
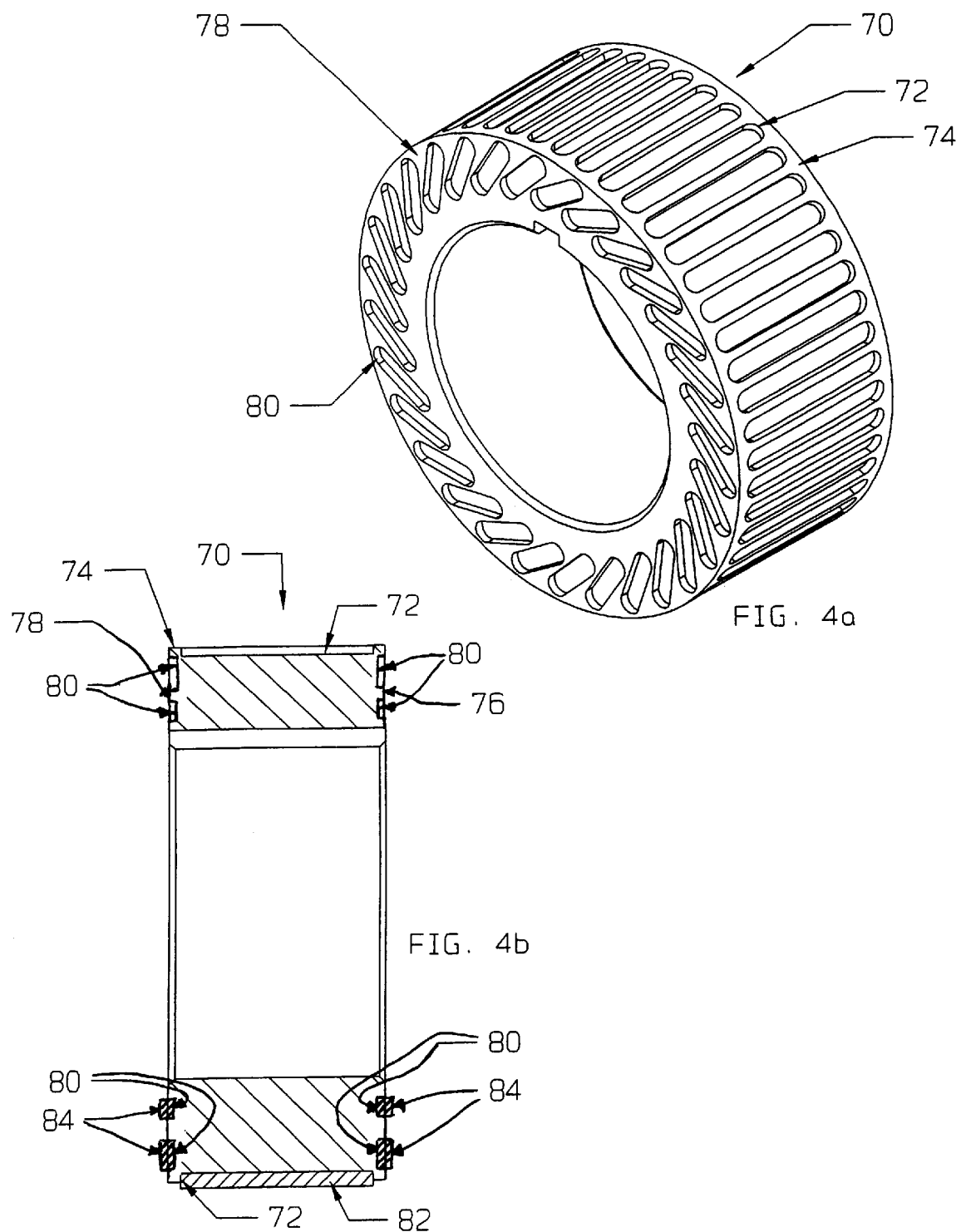
Figure 4C:
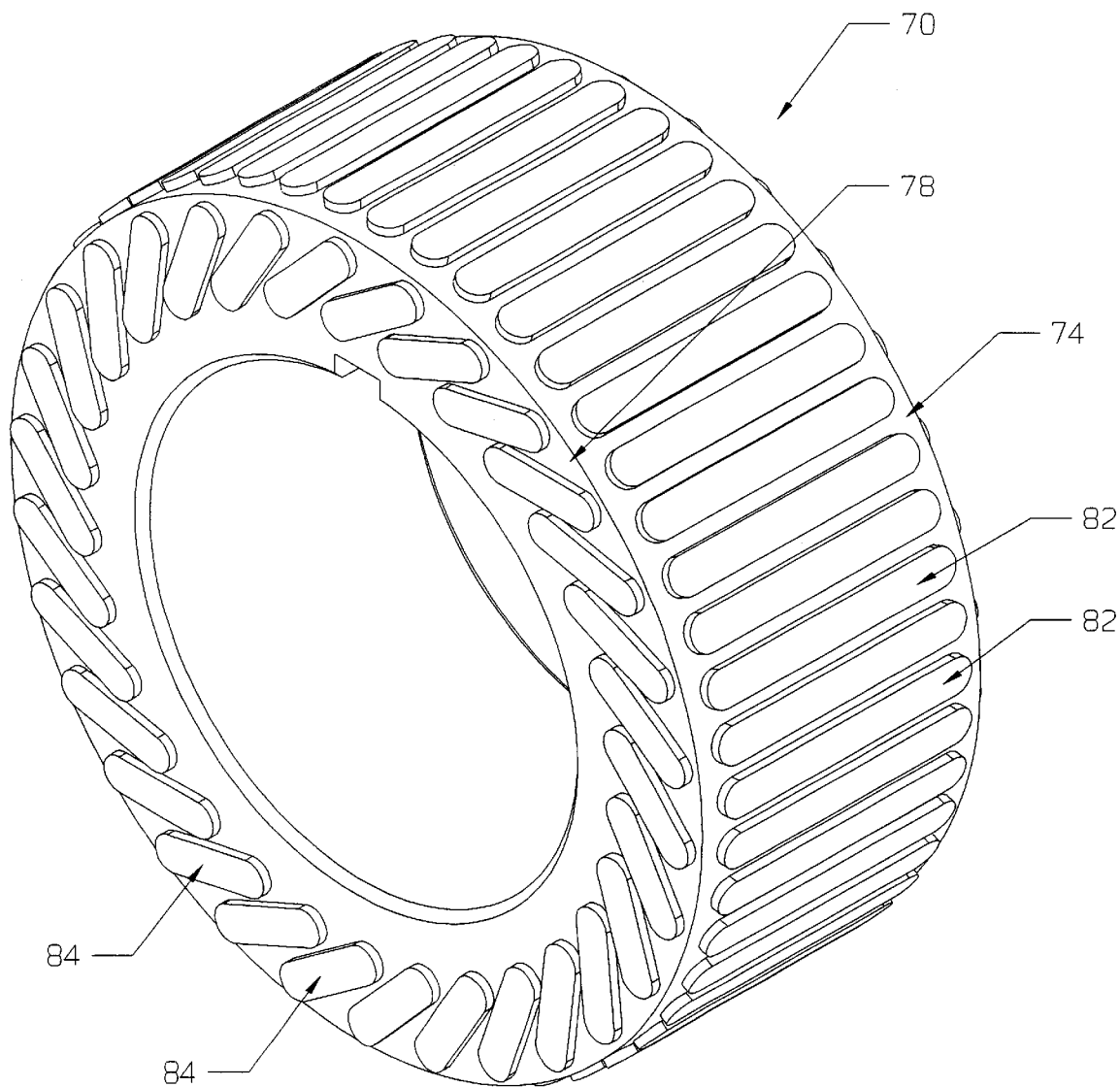
FIG. 4C is a perspective view of a bearing member of FIGS. 4A and 4B further including the plurality inserts installed into the circumferential and side recesses.

As shown in FIGS. 4a–4c, a second embodiment of a bearing member of the present invention 70 includes a plurality of axially extending, oblong notches 72 milled into the circumferential side surface 74 of the bearing member. The notches 72 preferably extend substantially completely along the axial width of the circumferential surface 74 and are somewhat wider than the notches of the first embodiment discussed above in FIGS. 2a–2d. Both the proximal side surface 76 and the distal side surface 78 include a plurality of substantially radially extending, oblong notches 80 milled therein. The notches 80 extend from the radially outward circumference of the side surfaces, and are angled with respect to the radius of the side surfaces. Referring to. FIGS. 4b and 4c, the notches 72 in the circumferential surface 74 each include a corresponding shaped insert 82 seated therein and protruding radially outwardly therefrom. Likewise, the notches 80 in the side surfaces each include correspondingly shaped insert 84 positioned therein and protruding axially outwardly therefrom.

Figure 5:
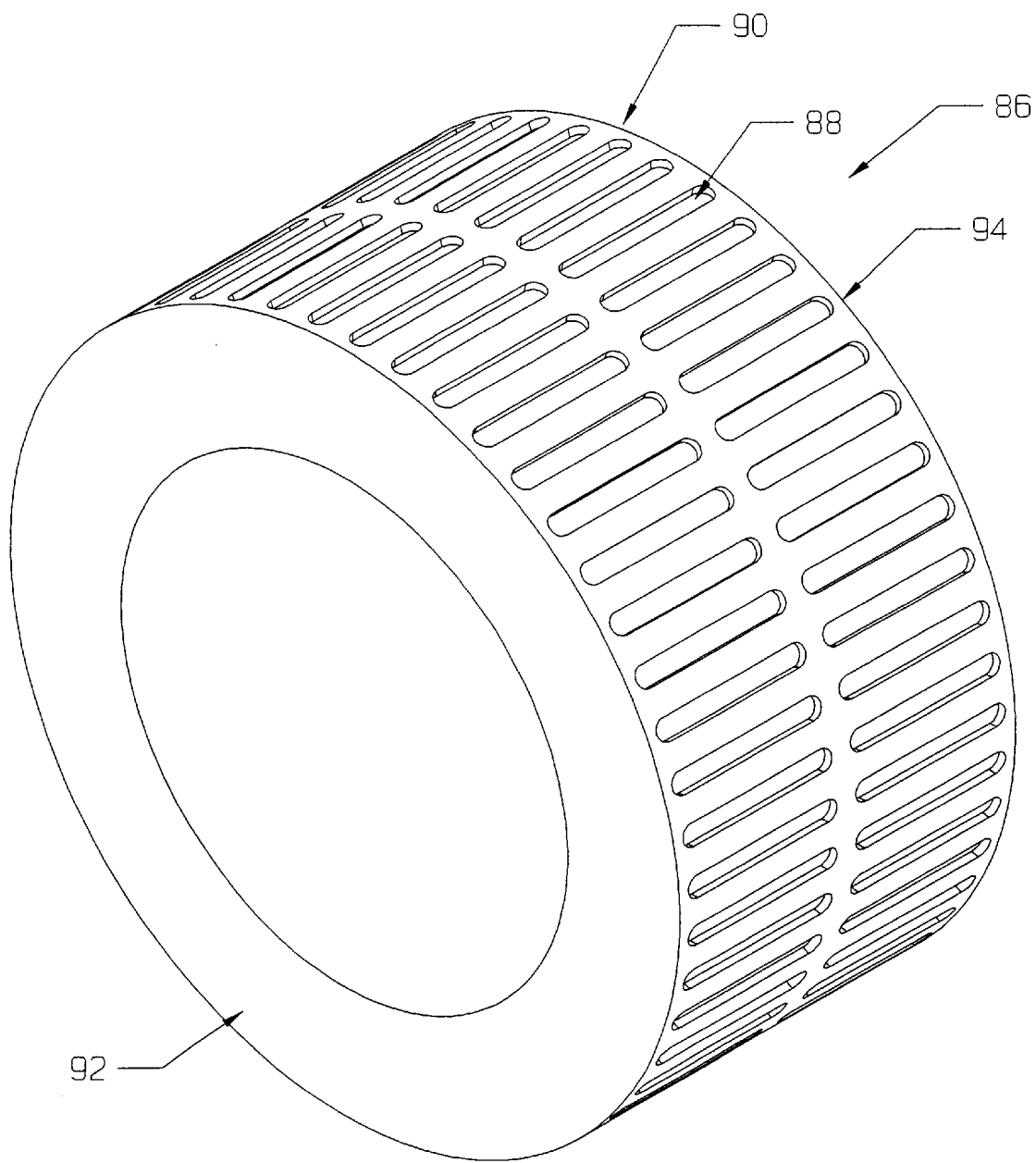
FIG. 5 is a perspective view of a third embodiment of a bearing member for use with the present invention.

As shown in FIG. 5, a third embodiment of a bearing member 86 includes a pair of circumferential rows of axially extending, oblong notches 88 milled into the outer circumferential surface 90. This bearing member 86, however, does not include notches milled into the side surfaces 92, 94.

The present invention also includes a method for fabricating the bearing members 18, 70, 86. The method includes the steps of: (a) forming an outer bearing housing member having a radially inwardly facing bearing surface, (b) forming an inner bearing member having a radially outwardly facing bearing surface, (c) forming a plurality of recesses in the radially outwardly facing bearing surface of the inner bearing member, (d) attaching a plurality of solid, abrasion resistant, friction members to the radially outwardly facing bearing surface such that a portion of each friction member protrudes radially therefrom, (e) turning or milling the inner member to remove material from the protruding portion of the friction-members such that a selected overall dimensional tolerance of the inner member is achieved, and (f) assembling the bearing by inserting the inner bearing member into the outer bearing housing member.

While the forms of apparatus herein described constitute preferred embodiments of the present invention, it is to be understood that the invention is not limited to these precise forms of apparatus, and that changes may be made therein without departing from the scope of the invention. For example, it is within the scope of the invention that the inner surfaces of the bearing housing member include the inserts attached thereto, rather than installing the inserts on the rotating bearing member. It is also within the scope of the invention that the inner cylindrical bearing member be stationary while the outer (bearing housing) member be rotating.

Accordingly, it is within the scope of the invention to provide a bearing assembly comprising a pair of relatively rotatable bearing components where at least a portion of a first one of the bearing components is journalled to at least a portion of the other one of the bearing components; where the first bearing component has an outer, circumferential journalled surface and an annular side surface, the other bearing component has an inner, circumferential journalled surface and an annular side surface; where one of the outer or inner, circumferential journalled surfaces includes a first plurality of notches disposed thereabout and one of the outer or inner, annular side surfaces includes a second plurality of notches disposed thereabout; and finally where the first and second plurality of notches are filled with a solid, abrasion resistant, self-lubricating material which protrudes outwardly from the first and second plurality of notches, thereby providing the outer bearing surfaces for abutting and wearing against the other journalled surfaces.

What is claimed is:

1. A method of forming a bearing comprising the steps of:
   forming an outer member having a radially inwardly facing bearing surface;
   forming an inner member having a radially outwardly facing bearing surface;
   attaching a plurality of solid friction members to the bearing surface of one of the inner or the outer bearing surfaces;
   removing material from the friction members such that a selected circular tolerance is achieved; and
   assembling the bearing by inserting the inner member into the outer member.

2. The method of claim 1 wherein said removing step includes the step of removing material from an outer surface of the friction members.

3. The method of claim 1 wherein said attaching step includes the steps of forming a plurality of recesses in the bearing surface of the selected one of the inner or outer bearing surfaces; and inserting the friction members into the recesses such that a portion of the friction members protrudes from the selected one of the surfaces.

4. The method of claim 1 wherein said inserting step includes the step of selecting friction members having sufficient thickness such that, at a minimum, the portion extends between a gap between a diameter of the outer bearing surface and a diameter of the inner bearing surface.

5. The method of claim 1 further comprising the steps of, prior to the assembling step, attaching a plurality of solid friction members to a radial bearing surface of one of the inner or outer members; and the assembling step includes the step of inserting the inner member into the outer member such that the radial bearing surface of the one of the inner or outer members is adjacent to a complementary radial bearing surface of the other of the inner or outer members.

6. A method of forming a bearing comprising the steps of:
   providing a first bearing component having a first bearing surface;
   providing a second bearing component having a second bearing surface and a plurality of recesses in the second bearing surface;
   attaching a plurality of solid friction members to the second bearing surface by inserting the friction members into the recesses such that a portion of each of the friction members protrudes from the second bearing surface;

turning the second bearing component to remove material from each of the friction members such that a selected overall circular tolerance of said second bearing component is achieved in a single turning process; and assembling the bearing by inserting the second bearing component into the first bearing component.

7. The method of claim 6 further comprising the step of providing a lubrication channel extending through the first bearing component, said lubrication channel adapted to be placed in fluid communication with a lubrication source.

8. A method of forming a bearing comprising the steps of:

forming a first bearing component having a first bearing surface;

forming a second bearing component having a second bearing surface;

attaching a plurality of solid friction members to the first bearing surface or the second bearing surface;

simultaneously removing material from each of the friction members such that a selected circular tolerance is achieved; and assembling the bearing by inserting the second bearing component into the first bearing component.

9. The method of claim 8 wherein said removing step includes the step of removing material from an outer surface of the friction members.

10. The method of claim 8 wherein said attaching step includes the steps of:

forming a plurality of recesses in the bearing surface; and inserting the friction members into the recesses such that a portion of each of the friction members protrudes from the bearing surface.

11. The method of claim 8 wherein the friction members have sufficient thickness such that, at a minimum, a portion of each of the friction members extends into a gap between the first bearing surface and the second bearing surface when the bearing is assembled.

12. The method of claim 8 further comprising the step of providing a lubrication channel extending through the first bearing component, said lubrication channel adapted to be placed in fluid communication with a lubrication source.

* * * * *

UNITED STATES PATENT AND TRADEMARK OFFICE
CERTIFICATE OF CORRECTION

PATENT NO. : 6,393,699 B1
DATED : May 28, 2002
INVENTOR(S) : Koenig

It is certified that error appears in the above-identified patent and that said Letters Patent is hereby corrected as shown below:

Column 4,
Line 24, please delete "52" and insert -- 152 --

Signed and Sealed this

Twenty-third Day of July, 2002

Attest:

JAMES E. ROGAN
Attesting Officer            Director of the United States Patent and Trademark Office

UNITED STATES PATENT AND TRADEMARK OFFICE
CERTIFICATE OF CORRECTION

PATENT NO.   : 6,393,699 B1
DATED        : May 28, 2002
INVENTOR(S)  : Koenig

It is certified that error appears in the above-identified patent and that said Letters Patent is hereby corrected as shown below:

<u>Title page,</u>
Item [74], *Attorney, Agent, or Firm*, please delete "Stanley" and insert -- Standley--

Signed and Sealed this

Fourth Day of March, 2003

JAMES E. ROGAN
*Director of the United States Patent and Trademark Office*